(12) United States Patent
Mittal et al.

(10) Patent No.: US 10,833,966 B2
(45) Date of Patent: Nov. 10, 2020

(54) SYSTEMS AND METHODS FOR SERVICE AVAILABILITY DETERMINATION IN PACKET NETWORKS

(71) Applicant: Ciena Corporation, Hanover, MD (US)

(72) Inventors: Aditya Mittal, Gurgaon (IN); Ashutosh Aggarwal, New Delhi (IN); Rajneesh Mishra, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 26 days.

(21) Appl. No.: 16/203,680

(22) Filed: Nov. 29, 2018

(65) Prior Publication Data
US 2020/0127909 A1    Apr. 23, 2020

(30) Foreign Application Priority Data

Oct. 17, 2018    (IN) .............................. 201811039370

(51) Int. Cl.
| | | |
|---|---|---|
| *H04L 12/26* | (2006.01) | |
| *H04L 12/54* | (2013.01) | |
| *H04L 12/70* | (2013.01) | |

(52) U.S. Cl.
CPC .......... *H04L 43/0811* (2013.01); *H04L 12/56* (2013.01); *H04L 43/0829* (2013.01); *H04L 2012/5625* (2013.01)

(58) Field of Classification Search
CPC . H04L 43/0811; H04L 12/56; H04L 43/0829; H04L 2012/5625

USPC ......................................................... 370/241
See application file for complete search history.

(56) References Cited

U.S. PATENT DOCUMENTS

2018/0278501 A1* 9/2018 Johnson .................. H04L 43/06

OTHER PUBLICATIONS

MEF Technical Specification; Ethernet Services Attributes Phase 3 (Year: 2013).*
MEF Technical Specification, MEF 10.3, Ethernet Services Attributes Phase 3, Oct. 2013, pp. 1-120.

* cited by examiner

*Primary Examiner* — Huy D Vu
*Assistant Examiner* — Nizam U Ahmed
(74) *Attorney, Agent, or Firm* — Clements Bernard Walker; Lawrence A. Baratta, Jr.; Christopher L. Bernard

(57) ABSTRACT

Service availability determination systems and methods include determining availability of a packet service in a Maintenance Interval (MI) based on frame loss measurements in short intervals Δt and marking each Δt as available or unavailable based on the frame loss measurements and an associated Frame Loss Ratio (FLR) threshold, wherein each Δt is a High Loss interval (HLI) when exceeding the FLR threshold; utilizing a sliding window of size n, n being an integer, to determine whether the packet service is available or unavailable; and utilizing an extension period after an end of the MI with the sliding window to ensure all Δt's in the MI are marked as available or unavailable.

18 Claims, 7 Drawing Sheets

SYSTEMS AND METHODS FOR SERVICE AVAILABILITY DETERMINATION IN PACKET NETWORKS

FIELD OF THE DISCLOSURE

The present disclosure generally relates to packet networking. More particularly, the present disclosure relates to systems and methods for service availability determination in packet networks.

BACKGROUND OF THE DISCLOSURE

In Ethernet networks, various techniques are utilized for Operations, Administration, and Maintenance (OAM) monitoring including G.8013/Y.1731 (August 2015) "Operations, administration and maintenance (OAM) functions and mechanisms for Ethernet-based networks," the contents of which are incorporated by reference herein. There are various techniques, performance monitoring tools, and metrics used to quantify an Ethernet service including whether or not the service meets a Service Layer Agreement (SLA). Metro Ethernet Forum (MEF) Technical Specification 10.3 "Ethernet Services Attributes Phase 3" October 2013, the contents of which are incorporated by reference herein, describes in Sec. 8.8.4 a technique for a one-way availability performance measurement for an Ethernet Virtual Circuit (EVC). This availability performance measurement is one such important metric. As per MEF 10.3, service availability of given service can be computed by measuring the Frame Loss Ratio (FLR) for short intervals called $\Delta t$'s within an Availability Measurement Interval (AMI). As an example, a service provider can define the Availability Performance to be measured over a month and the value for the Availability Performance objective to be 95% for one Class of Service (COS). Again, per MEF 10.3, $\Delta t$ state (i.e., available or unavailable) is marked using a sliding window algorithm. The availability performance measurement in MEF 10.3 has accuracy problems. First, there is inaccuracy in the calculation of service availability due to an ignored $\Delta t$ at the end of each AMI. Second, the inaccuracy can be worse such as due to a scenario where a few High Loss Interval (HLI) are present in a Maintenance Interval (MI) causing the entire MI to be marked as unavailable if this MI starts incorrectly in the unavailable state because of ignored $\Delta t$ at the end of the previous MI. Third, there can be an inaccurate transition of service availability state. These inaccuracies lead to scenarios where determined availability is significantly different from the actual availability.

BRIEF SUMMARY OF THE DISCLOSURE

In an embodiment, a service availability determination method implemented in a packet network element includes determining availability of a packet service in a Maintenance Interval (MI) based on frame loss measurements in short intervals $\Delta t$ and marking each $\Delta t$ as available or unavailable based on the frame loss measurements and an associated Frame Loss Ratio (FLR) threshold, wherein each $\Delta t$ is a High Loss Interval (HLI) when exceeding the threshold; utilizing a sliding window of size n, n being an integer, to determine whether the packet service is available or unavailable; and utilizing an extension period after an end of the MI with the sliding window to ensure all $\Delta t$'s in the MI are marked as available or unavailable. The service availability determination method can further include determining availability of the packet service between two successive MI's which is separated by a repetition time, wherein second MI is inheriting availability state from the previous MI. The service availability determination method can further include determining availability over a time period greater than the MI and the second MI based on the availability determined in at least the MI and the second MI. The extension period is between 0 and (n−1) times a length of each $\Delta t$. At an end of the MI, if a current availability state is unavailable and the last $\Delta t$ is not an HLI, the extension period can be utilized until there is an HLI interval or n−1 $\Delta t$'s allowing a last $\Delta t$ of the MI to be marked as available. At an end of the MI, if a current availability state is available and the last $\Delta t$ is an HLI, the extension period can be utilized until there is a non-HLI interval or n−1 $\Delta t$'s allowing a last $\Delta t$ of the MI to be marked as unavailable. The frame loss measurements can be compliant to G.8013/Y.1731.

In another embodiment, a packet network element includes one or more ports; a switching fabric configured to switch packets between the one or more ports; and a controller configured to determine availability of a packet service in a Maintenance Interval (MI) based on frame loss measurements in short intervals $\Delta t$ and marking each $\Delta t$ as available or unavailable based on the frame loss measurements and an associated Frame Loss Ratio (FLR) threshold, wherein each $\Delta t$ is a High Loss Interval (HLI) when exceeding the IFR threshold, utilize a sliding window of size n, n being an integer, to determine whether the packet service is available or unavailable, and utilize an extension period after an end of the MI with the sliding window to ensure all $\Delta t$'s in the MI are marked as available or unavailable. The controller can be further configured to determine availability of the packet service between two successive MI's which is separated by a repetition time, wherein second MI is inheriting availability state from the previous MI. The controller can be further configured to determine availability over a time period greater than the MI and the second MI based on the availability determined in at least the MI and the second MI. The extension period is between 0 and (n−1) times a length of each $\Delta t$. At an end of the MI, if a current availability state is unavailable and the last $\Delta t$ is not an HLI, the extension period can be utilized until there is an HLI interval or n−1 $\Delta t$'s allowing a last $\Delta t$ of the MI to be marked as available. At an end of the MI, if a current availability state is available and the last $\Delta t$ is an HLI, the extension period can be utilized until there is a non-HLI interval or n−1 $\Delta t$'s allowing a last $\Delta t$ of the MI to be marked as unavailable. The frame loss measurements can be compliant to G.8013/Y.1731.

In a further embodiment, a packet network includes a first network element which is a first Maintenance End Point (MEP); and a second network element which is a second MEP communicatively coupled to the first MEP, wherein availability of a packet service between the first MEP and the second MEP is determined in a Maintenance Interval (MI) based on frame loss measurements in short intervals $\Delta t$ and marking each $\Delta t$ as available or unavailable based on the frame loss measurements and an associated Frame Loss Ratio (FLR) threshold, wherein each $\Delta t$ is a High Loss Interval (HLI) when exceeding the FLR threshold, wherein a sliding window of size n, n being an integer, is utilized to determine whether the packet service is available or unavailable, and wherein an extension period is utilized after an end of the MI with the sliding window to ensure all $\Delta t$'s in the MI are marked as available or unavailable. Availability of the packet service is also determined between two successive MI's which is separated by a repetition time, wherein second MI is inheriting availability state from the previous MI. Availability over a time period greater than the MI and the second MI is determined based on the availability determined in at least the MI and the second MI. The extension period is between 0 and (n−1) times a length of each Δt. At an end of the MI, if a current availability state is unavailable and the last Δt is not an HLI, the extension period can be utilized until there is an HLI interval or n−1 Δt's allowing a last Δt of the MI to be marked as available. At an end of the MI, if a current availability state is available and the last Δt is an HLI, the extension period can be utilized until there is a non-HLI interval or n−1 Δt's allowing a last Δt of the MI to be marked as unavailable.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
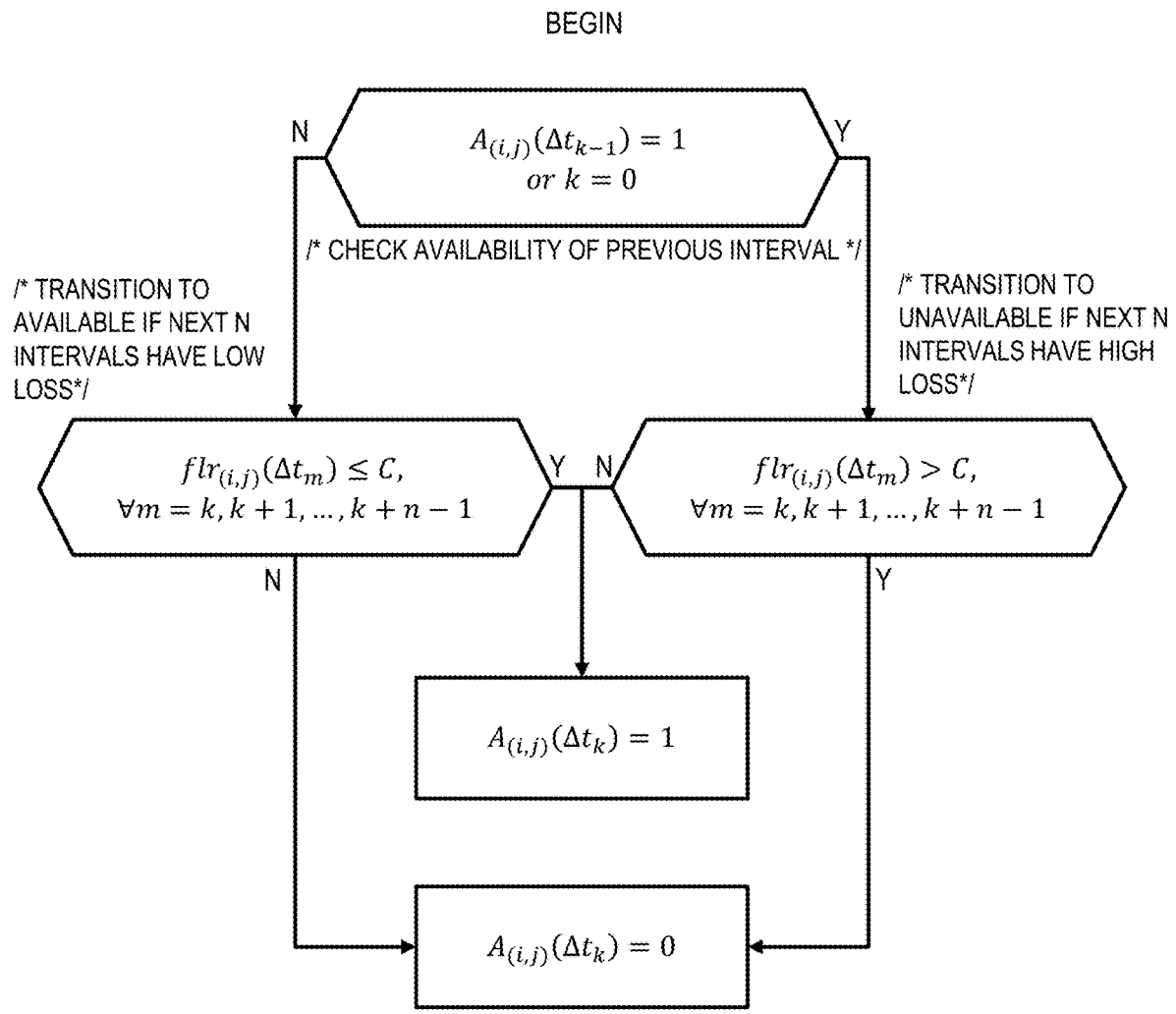
FIG. 1 is a flowchart of a process for determining $A_{(i,j)}$ ($Δt_k$) which defines availability/unavailability of a time interval $Δt_k$ in a one-way Availability Performance for an Ethernet Virtual Circuit (EVC)

In various embodiments, the present disclosure relates to systems and methods for service availability determination in packet networks. The systems and methods address significant inaccuracies in the MEF 10.3 one-way availability performance measurement for an Ethernet Virtual Circuit (EVC). Advantageously, the systems and methods enable an Ethernet service to be reliably measured by eliminating the inaccuracy caused by ignoring frames exchanged towards an end of the MI. With accurate measurements, Ethernet services are properly marked as available or unavailable thereby improving network operation with respect to restoration, improving customer experience, etc.

One-Way Availability Performance for an EVC

Availability Performance is the percentage of time within a specified time interval during which the Service Frame loss is small (i.e., below a configured threshold). As an example, a service provider can define the Availability Performance to be measured over a month and the value for the Availability Performance objective to be 99.9%. In a month with 30 days and no Maintenance Interval, this objective will allow the service to be unavailable for approximately 43 minutes out of the whole month.

Informally, Availability Performance is based on Service Frame loss during a sequence of consecutive small time intervals. This can be based on an Ethernet frame loss measurement (ETH-LM) or Ethernet synthetic frame loss measurement (ETH-SLM) from G.8013/Y.1731 or the like.

When the previous sequence was defined as Available, if the frame loss is high for each small time interval in the current sequence, then the small time interval at the beginning of the current sequence is defined as unavailable; otherwise, it is defined as available. On the other hand, when the previous sequence was defined as unavailable, if frame loss is low for each small time interval in the current sequence, then the small time interval at the beginning of the current sequence is defined as available; otherwise, it is defined as unavailable.

The formal definition for the Availability Performance is a follows:

For a time interval T, and a given Class of Service Name, Availability from ingress User-Network Interface (UNI) i to egress UNI j is based on the following three parameters:

Δt is a time interval much smaller than T,

C is a frame loss ratio threshold which if exceeded suggests unavailability, and n is the number of consecutive small time intervals, Δt, over which to assess availability.

Each $Δt_k$ in T is defined to be either "available" or "unavailable" and this is represented by $A_{(i,j)}(Δt_k)$ where $A_{(i,j)}(Δt_k)=1$ means that $Δt_k$ is available and $A_{(i,j)}(Δt_k)=0$ means that $Δt_k$ is unavailable.

The definition of $A_{(i,j)}(Δt_k)$ is based on the frame loss ratio function, $flr_{(i,j)}(Δt_k)$, which is defined as follows:

Let $I_{Δt}^{(i,j)}$ be the number of ingress Service Frames that meet various conditions (which are described on page 35 of MEF 10.3). Let $E_{Δt}^{(i,j)}$ be the number of unique (not duplicate) egress Service Frames where each Service Frame is the first unerrored egress Service Frame at UNI j that results from the Service Frame counted in $I_{Δt}^{(i,j)}$.

Then $$flr_{(i,j)}(Δt_k) = \begin{cases} \left(\frac{I_{Δt}^{(i,j)} - E_{Δt}^{(i,j)}}{I_{Δt}^{(i,j)}}\right) & \text{if } I_{Δt}^{(i,j)} \geq 1 \\ 0 & \text{otherwise} \end{cases}$$

$Δt_0$ is the first short time interval agreed by the Service Provider and Subscriber at or around the turn-up of the EVC. $A_{(i,j)}(Δt_k)$ is defined by a process 10 illustrated in a flowchart in FIG. 1.

An alternate way of expressing $A_{(i,j)}(Δt_k)$ for k=0 is:

$$A_{(i,j)}(Δt_o) = \begin{cases} 0 & \text{if } flr_{(i,j)}(Δt_m) > C, \text{ for all } m = 0, 1, \ldots, n-1 \\ 1 & \text{otherwise} \end{cases}$$

And for k=1, 2, . . . .

$$A_{(i,j)}(Δt_k) = \begin{cases} 0 & \begin{array}{l}\text{if } A_{(i,j)}(Δt_{k-1}) = 1 \text{ and } flr_{(i,j)}(Δt_m) > C, \\ \text{for all } m = k, k+1, \ldots, k+n-1\end{array} \\ 1 & \begin{array}{l}\text{if } A_{(i,j)}(Δt_{k-1}) = 0 \text{ and } flr_{(i,j)}(Δt_m) \leq C, \\ \text{for all } m = k, k+1, \ldots, k+n-1\end{array} \\ A_{(i,j)}(Δt_{k-1}) & \text{otherwise} \end{cases}$$

The availability for $Δt_k$ is based on the FLR during the short interval and each of the following n−1 short intervals and the availability of the previous short time interval. In other words, a sliding window of width nΔt is used to determine availability.

Further, a Maintenance Interval (MI) is a time interval agreed to by the Service Provider and Subscriber during which the service may not perform well or at all. The MI should be excluded from the Availability Performance.

Problem Description

Again, in networks, the performance of a service is monitored using G.8013/Y.1731 performance monitoring tools where various metrics are measured/calculated to determine whether a service meets the SLA or not. Availability is one such important metric. As described herein, per MEF 10.3, service availability of given service can be computed by measuring the FLR for short intervals called $\Delta t$'s within an Availability Measurement Interval (AMI). As an example, a service provider can define the Availability Performance to be measured over a month and the value for the Availability Performance objective to be 95% for one Class of Service (CoS).

$\Delta t$ could be High Loss Interval (HLI), i.e., 0 (when $\Delta t$'s FLR>Threshold FLR) and Non-HLI, i.e., 1 (when $\Delta t$'s FLR≤Threshold FLR).

$\Delta t$ state, i.e., available or unavailable, is marked using sliding window algorithm which slides over the next (n−1) $\Delta t$'s in given window to mark the 1st $\Delta t$ and so on ('n' is the window size). The availability for a particular class of service name from UNI i to UNI j for a time interval T is based on the percentage of $\Delta t$'s available. Thus, whether a Maintenance Entity is in available time or unavailable time for a given service cannot be determined until a period of n $\Delta t$ (the Availability Window) has passed. FIG. 1 illustrates the state transitions and marking of each $\Delta t$ depending upon the loss results for next (n−1) $\Delta t$'s.

Figure 2:
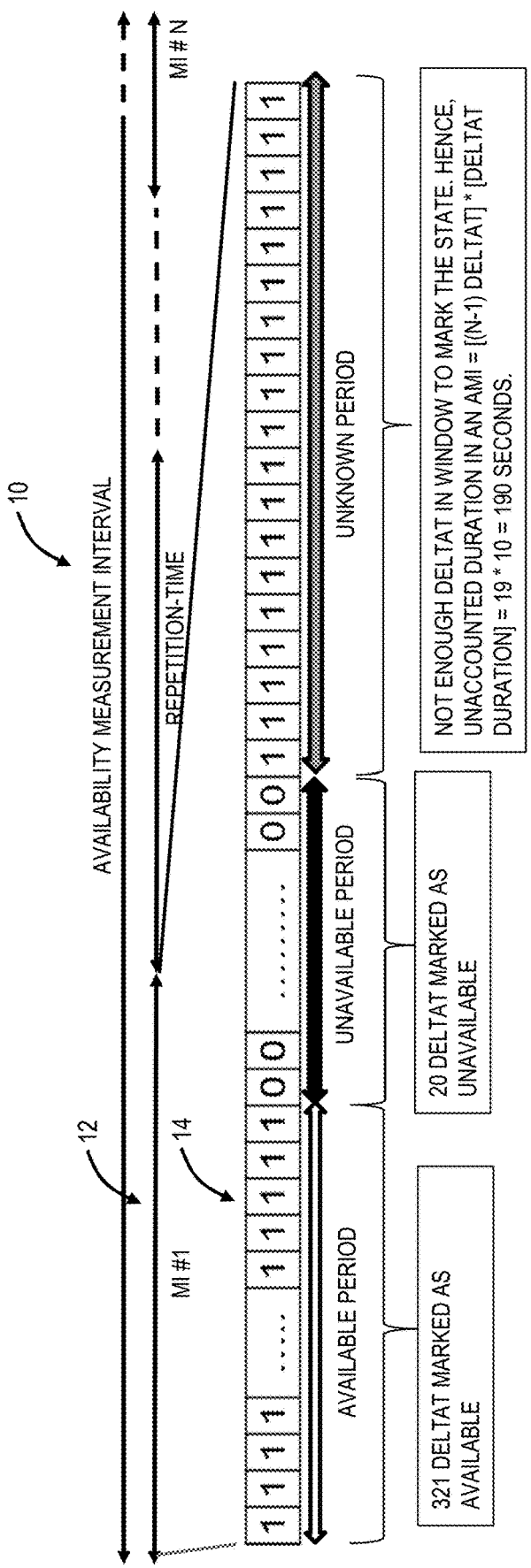
FIG. 2 is a block diagram of an example availability calculation.

FIG. 2 is a block diagram of an example availability calculation. There is an AMI 10 which can be 3 hours in this example with MI 12 being an hour with a delay between successive MI 12 (repetition-time) of an hour. The short measurement interval $\Delta t$ can be 10 sec. and the sliding window size (n) can be 20. In this example, in the MI #1 12, the first 321 $\Delta t$ is marked as available, and a next 20 $\Delta t$ are marked as unavailable. Finally, there are not enough $\Delta t$ in the sliding window (n=20) to mark the state for the last 19 $\Delta t$. Hence, there is an unaccounted duration in the AMI 10 of 19*10 sec.=190 sec. FIG. 2 illustrates some scenarios where the $\Delta t$ state cannot be marked accurately due to insufficient $\Delta t$'s in a given sliding window. This has a large impact on the service availability determination and can cause problems for SLA compliance. Specifically, the conventional service availability computation is inaccurate due to the ignored $\Delta t$'s at the end of the AMI 10.

Figure 3:
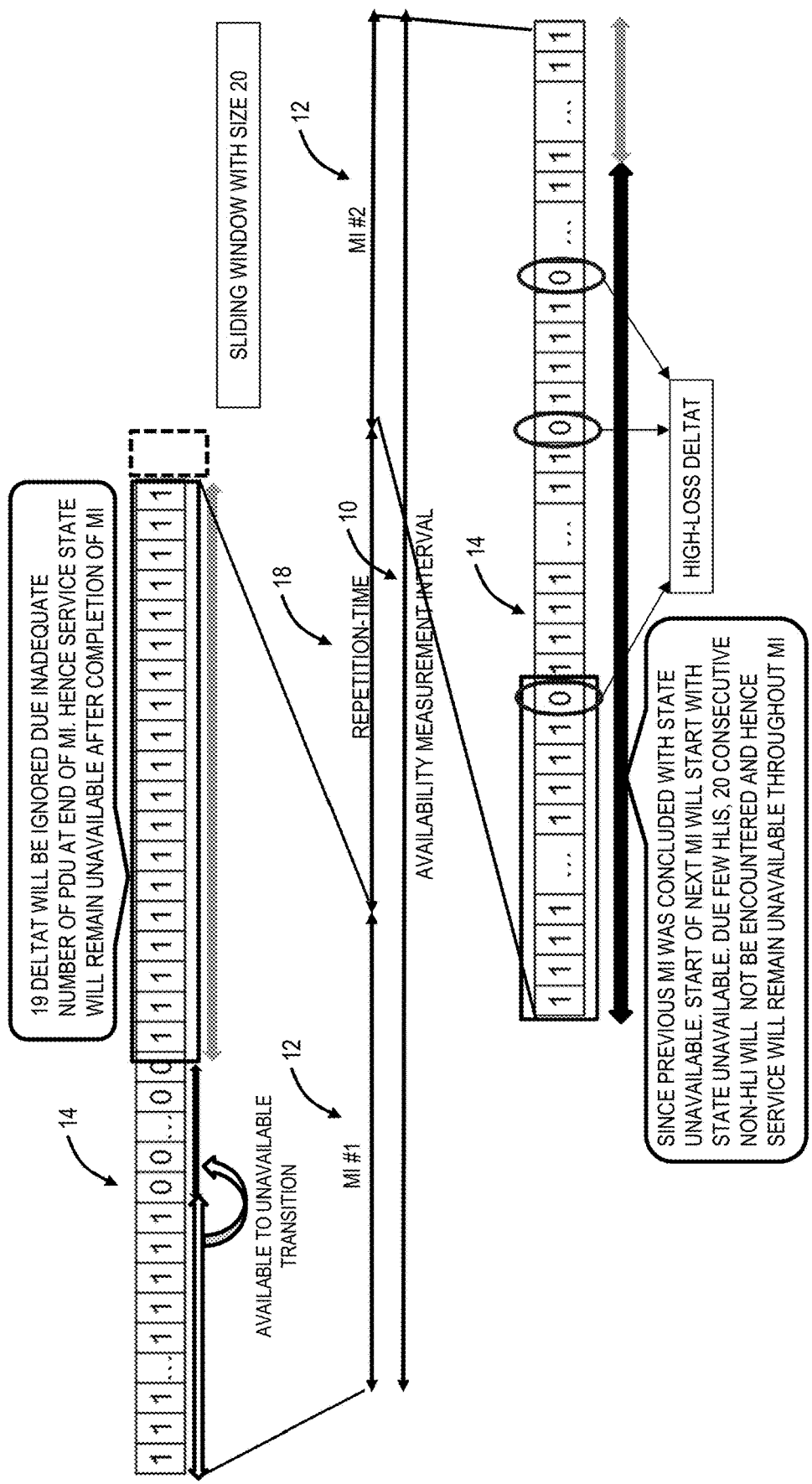
FIG. 3 is a block diagram continuing the example availability calculation of FIG. 2 illustrating a second Maintenance Interval (MI)

FIG. 3 is a block diagram continuing the example availability calculation of FIG. 2 illustrating a second MI 12. Here, the first MI 12 is as illustrated in FIG. 2 with the 19 $\Delta t$'s ignored. A repetition time 18 follows the first MI 12 and then the second MI 12 begins. Since the first MI 12 was concluded with an unavailable state, the second MI 12 begins unavailable, namely the service is unavailable for 20 $\Delta t$'s. In this example, there are a few HLI's in the second MI 12 causing 20 consecutive non-HLI $\Delta t$'s not to be encountered in the second MI 12 thus service is unavailable for the entire second MI 12 or for 341 $\Delta t$'s.

Service availability is computed for the AMI 10 based on the two MI 12, and 19 $\Delta T$ are ignored at the end of each MI 12 in this example as well as the entire second. MI 12 being unavailable. Total number of $\Delta t$'s with indications in the AMI 10 is Total indicator in *MI* #1(341)+Total Indicator in *MI* #2(341)=682.

Note, the total is 341 which is 360 minus 19. That is, each MI 12 is one hour, and each $\Delta t$ is 10 sec., so each MI has 360 $\Delta t$'s and with the last 19 ignored, each MI 12 contributes 341 $\Delta t$'s.

In a day, there will be 8 such AMI 10 (as each AMI is 3 hours). Hence, the total indicator in a day (24 hours) will be 682*8=5456. Now, based on the first MI 12 and the second MI 12, the service availability for a day will be 5095 which is 5456 minus 20 minus 341. The SLA calculation here is (5456−(20+341))/5456=93.384%. The ignored $\Delta t$'s result in an SLA of 93.384% which violates the 95% SLA agreement.

Figure 4:
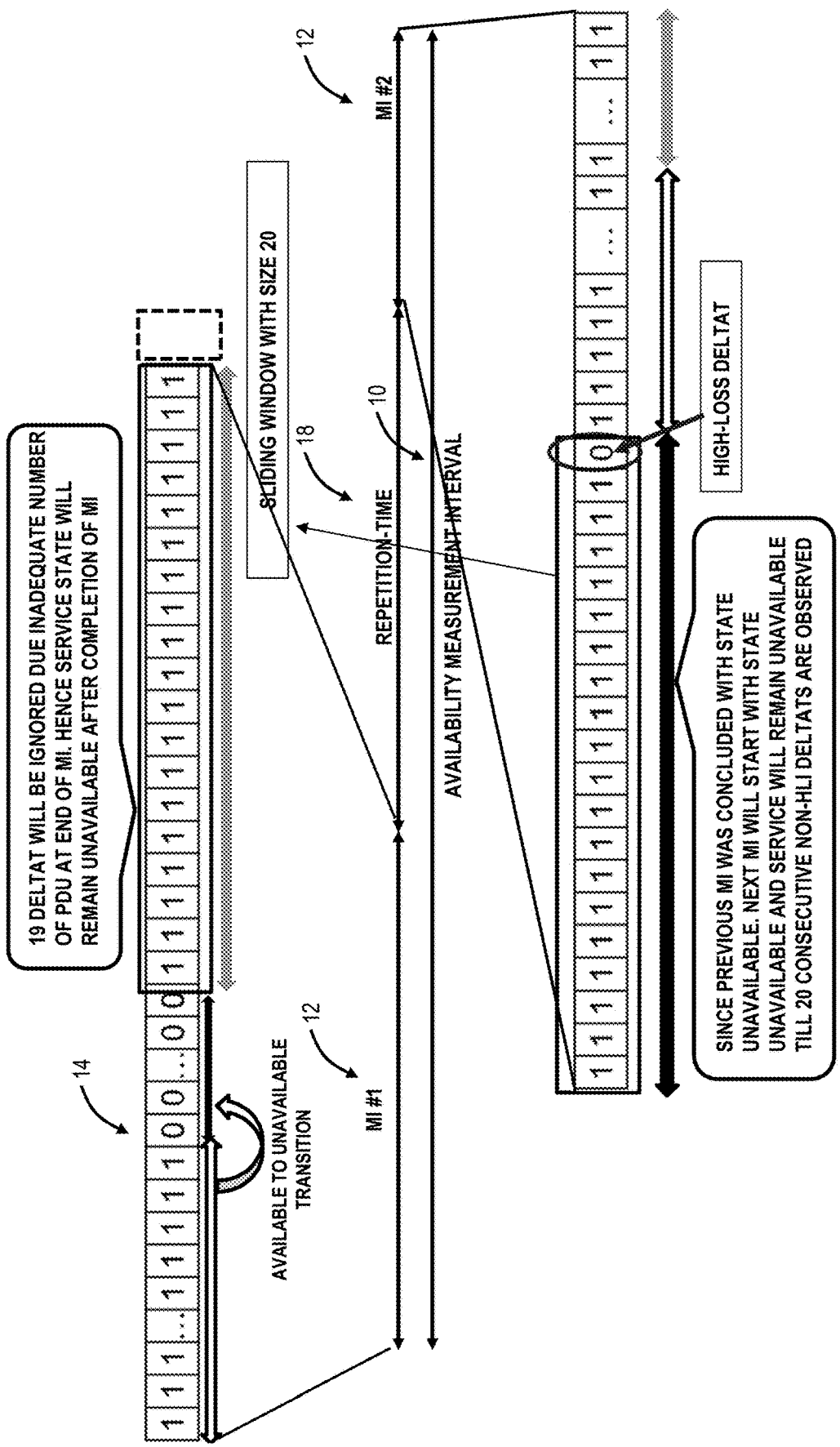
FIG. 4 is a block diagram continuing the example availability calculation of FIG. 2 illustrating another second MI.

FIG. 4 is a block diagram continuing the example availability calculation of FIG. 2 illustrating another second MI 12. Considering the previous example for service availability computation, i.e., in an hour of the MI 12, assume the service was down for 200 seconds accounted by 20 $\Delta t$'s. Since the previous MI was concluded with the state unavailable. The second MI 12 will start with state unavailable, and the service will remain unavailable until 20 consecutive non-HLI $\Delta t$'s are observed.

Thus, the sliding window can cause a significant number of $\Delta t$'s to be ignored as illustrated in FIGS. 3-4.

Accurate Service Availability Determination in Packet Networks

To address the aforementioned problem, no $\Delta t$'s are ignored due to insufficient $\Delta t$'s in a sliding window such that the percentage calculation for the availability metric is more accurate. With the proposed solution, the total service indicator, i.e., the sum of available and unavailable indicators is equal to a number of $\Delta t$'s in a given AMI 10. Whereas without this solution, the total service indicator is less by m*(n−1) $\Delta t$'s where m=No. of MI's in an AMI and n=window size in the given AMI 10.

Figure 5:
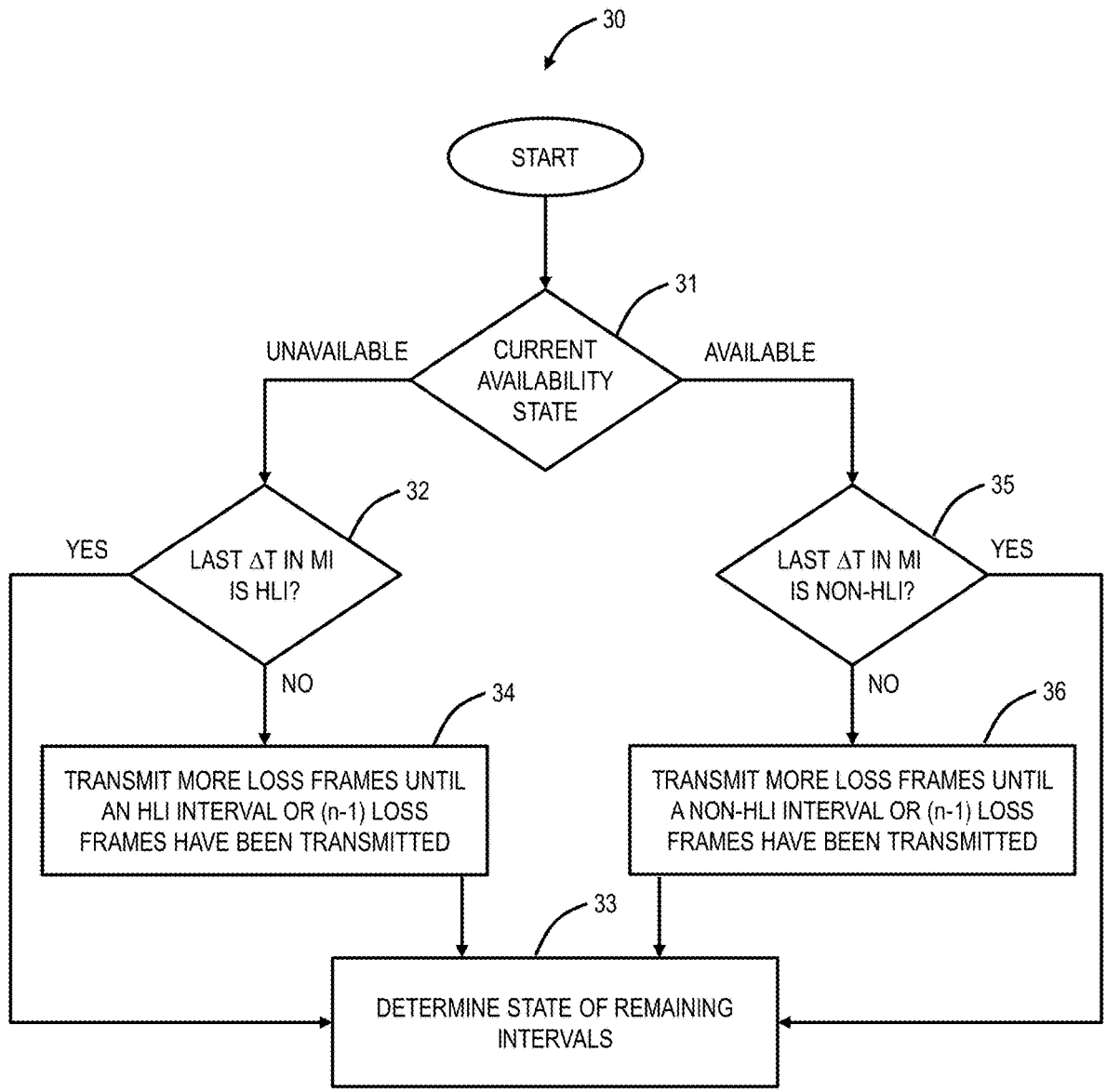
FIG. 5 is a flowchart of an accurate service availability determination process in packet networks.

FIG. 5 is a flowchart of an accurate service availability determination process 30 in packet networks. The process 30 includes an extension of the sliding window into the repetition time 18, i.e., service frame loss measurement Protocol Data Unit (PDU) will happen in the repetition time 18 for a short duration to conclude the unaccounted $\Delta t$'s from the previous MI 12. This short duration is an extension period (X) that could range from 0≤X≤(n−1) $\Delta t$'s where n is the sliding window size. For example, using the example values from above when n=20 and $\Delta t$ is 10 sec. The extension period X could be up to 190 sec. In this manner, there is no scenario in the MI 12 where $\Delta t$'s are ignored thereby leading to a more accurate availability determination.

The process 30 is implemented in a packet network element in a packet network, to extend the MI 12 such that $\Delta t$'s are not ignored due to the mechanics of the sliding window. At the end of the MI 12, the current availability state (step 31) is either unavailable or available based on service frame loss measurement in preceding $\Delta t$'s and the sliding window. As described herein, the sliding window can cause $\Delta t$'s to be ignored, and the process 30 ensures that no $\Delta t$'s are ignored by extending the MI 12 into the extension period X.

If the current availability state (step 31) is unavailable, and the last $\Delta t$ in the MI 12 is an HLI (step 32), the process 30 does not require the extension period X and the last $\Delta t$'s are unavailable, i.e., it is possible to determine the state of the remaining intervals in the MI 12 (step 33) as the last $\Delta t$'s in the MI 12 are all unavailable.

Now, if the current availability state (step 31) is unavailable, and the last $\Delta t$ in the MI 12 is not an HLI (step 32), the process 30 includes transmitting more loss frames until an HLI interval is determined or until (n−1) loss frames have been transmitted (step 34). Here, the current availability state is unavailable, but the last Δt is not an HLI meaning there could be a state transition to available. Conventionally, these last Δt's would be ignored as described herein. However, the process 30 extends the MI 12 into the extension period X for up to (n−1) Δt to give the state a chance to change to available. In the extension period X, if there is an HLI, then the extension period X ends as the state remains unavailable (step 33). In the extension period X, if there are no HLI's and (n−1) loss frames have been transmitted (step 34), then the state can transition to available (step 33). Thus, step 34 allows a proper determination of the unavailable state at the end of the MI 12.

Similarly, if the current availability state (step 31) is available and the last Δt in the MI 12 is non-HLI (step 35), the process 30 does not require the extension period X and the last Δt's are available, i.e., it is possible to determine the state of the remaining intervals in the MI 12 (step 33) as the last Δt's in the MI 12 are all available.

Now, if the current availability state (step 31) is available and the last Δt in the MI 12 is an HLI (step 35), the process 30 includes transmitting more loss frames until a non-HLI interval is determined or until (n−1) loss frames have been transmitted (step 36). Here, the current availability state is available, but the last Δt is an HLI meaning there could be a state transition to unavailable. Again, conventionally, these last Δt's would be ignored as described herein. However, the process 30 extends the MI 12 into the extension period X for up to (n−1) Δt to give the state a chance to change to unavailable. In the extension period X, if there is a non-HLI then the extension period X ends as the state remains available (step 33). In the extension period X, if (n−1) loss frames have been transmitted and no non-HLI interval (step 36), then the state can transition to unavailable (step 33). Thus, step 36 allows a proper determination of the available state at the end of the MI 12.

Example Operation

The service availability is computed as (Total Available Indicator)/(Total accounted Indicator). Without the process 30, if 19Δt's, i.e., (n−1) Δt's, are ignored, then the availability states of the next Δt is marked as unavailable. As described herein, when the Δt's are ignored at the end of one MI 12, the first n (e.g., 20) Δt's in the next MI 12 are marked as unavailable instead of accurately marked as available.

Now, this can lead to a significant difference in the actual availability versus the calculated availability since this unavailable marking of the first Δt in the next MI 12 is not necessarily accurate since the Δt's are ignored in the first MI 12, Thus, the second MI 12 will have an unavailable state for the first n Δt's until the state can be changed to available.

For example, assume there are only two MI's 12 in a day and this example described herein would cause the loss of n Δt's in the second MT 12. This could lead to an SLA for the availability of 94% while the actual availability was 99.6%, within the SLA. The process 30 allows the availability to be accurately computed without wasting ignored Δt's. Further, the described problem can be even worse when service availability is computed for a month. Also, inaccuracy in making the transition from unavailable to available can even cause multiple AMIs to be marked as unavailable. But with process 30, the described problem can be completely resolved.

Network

Figure 6:
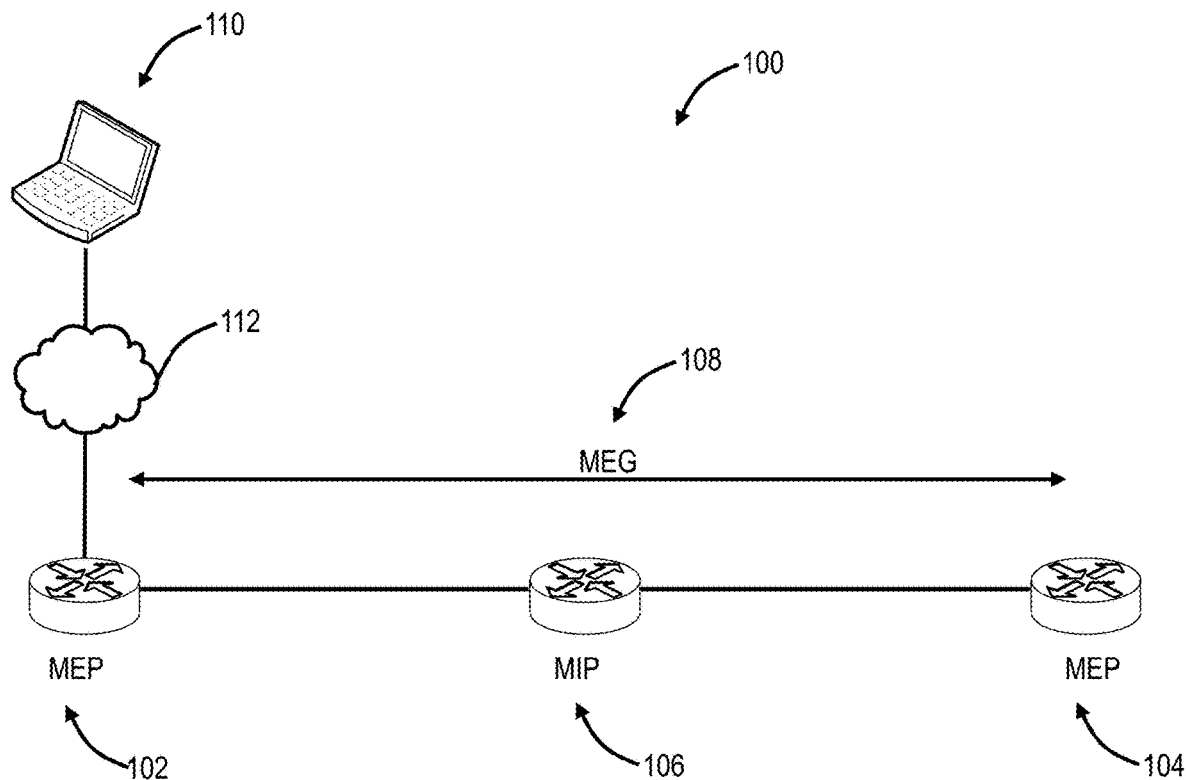
FIG. 6 is a network diagram of an example network utilizing Ethernet OAM mechanisms.

FIG. 6 is a network diagram of an example network 100 utilizing Ethernet OAM mechanisms. For illustration purposes, the network 100 includes three interconnected network elements 102, 104, 106. The network 100 utilizes Ethernet OAM mechanisms such as IEEE 802.1ag Connectivity Fault Management (CFM), Y.1731, etc. Fundamental to CFM is the concept of a Maintenance Entity Group (MEG) or a Maintenance Association (MA), which is the identified network transport construct spanning the various network nodes underlying a given service or set of services. CFM relies on well-defined messages (OAM PDUs) exchanged between the network elements, specifically and in particular each End Point (MEP) that provides origination and termination of the service transport path(s) for a MEG or MA. The network elements 102, 104 are defined as an MEP. In CFM, an MEP is configured to source and sink OAM PDUs, i.e., source and sink within a single configured MD (Maintenance Domain), pass-thru if MD Level is higher than the configured level for the MEP, and discard if MD Level is lower. The MEPs 102, 104 are also configured to participate in performance monitoring such as loss measurement, delay measurement, link trace, loopback, etc. In a point-to-point network, there are two MEP nodes at the endpoints, and in other configurations, there may be multiple MEP nodes. Also, a CFM domain having one or more Maintenance Intermediate Point (MIP) nodes that may be bounded by a plurality of MEP nodes. In order that CFM frame flows are appropriately filtered so that they are processed only by the intended domain's nodes, the MEP/MIP population of an Ethernet CFM network is configured appropriately.

The network element 106 is defined as a MIP which resides between MEPs, i.e., the MIP 106 is communicatively coupled between the MEPs 102, 104. A MIP is configured to process and forward CFM frames but does not initiate CFM frames. Although a MIP does not initiate protocol transactions, it does transmit Loopback Reply (LBR) and Linktrace Reply (LTR) messages in response to received Loopback Message (LBM) and Linktrace Message (LTM) messages respectively. As described herein, MEP and MIP terminology is used for nodes present at endpoints and intermediate points, respectively, in the network 100. Also, Ethernet Path terminology is used to denote a point-to-point Ethernet connection between two nodes, e.g., the connection being built using Virtual Local Area Network (VLAN) cross connection or unicast Ethernet Media Access Control (MAC) plus VLAN connection. Additionally, other types of Ethernet paths, such as, for example, Provider Backbone Bridging-Traffic Engineering (PBB-TE), MPLS-TP, and the like are also contemplated by the systems and methods described herein.

The systems and methods contemplate implementation and operation in networks, network devices, network elements, Virtual Network Functions (VNFs), etc. such as those compliant with IEEE 802.1ag-2007, G.8013/Y.1731, and/or MEF. Of note, IEEE 802.1ag-2007 and G.8013/Y.1731 both relate to and define CFM for Ethernet OAM. Various terminology utilized herein, such as MEP, MIP, CCM, PDU, etc. is common to each of IEEE 802.1ag-2007, G.8013/Y.1731, MEF, etc. IEEE 802.1ag-2007 utilizes the term Maintenance Association (MA) whereas G.8013/Y.1731 utilizes Maintenance Entity Group (MEG) for the same aspect. Those of ordinary skill in the art will recognize while described herein as the MEG; the MEG could also be referred to as the MA 108. Generally, the MEG and MA 108 relate to an administrative grouping relative to the MEPs 102, 104.

The network elements 102, 104, 106 are configured in an MA 108 which enable a grouping of nodes in a maintenance group for OAM to be grouped on different spans. The MA 108 is a set of MEPs, each configured with a same unique MA ID code (UMC) and Maintenance Association Identifier (MAID) and Maintenance Domain (MD) level. The MA 108 may be thought of as a full mesh a Maintenance Entities (MEs), the MEs including MEPs, MIPs, etc., with a set of MEPs configured therebetween. The network 100 can also include a management system 110 communicatively coupled to the network elements 102, 104, 106 through a data communications network 112. The management system 110 can be a Network Management System (NMS), an Element Management System (EMS), a craft interface, etc. In an embodiment, the management system 110 is configured to provide OAM access to the network 100 as well as the provisioning of services and the like.

Network Element

Figure 7:
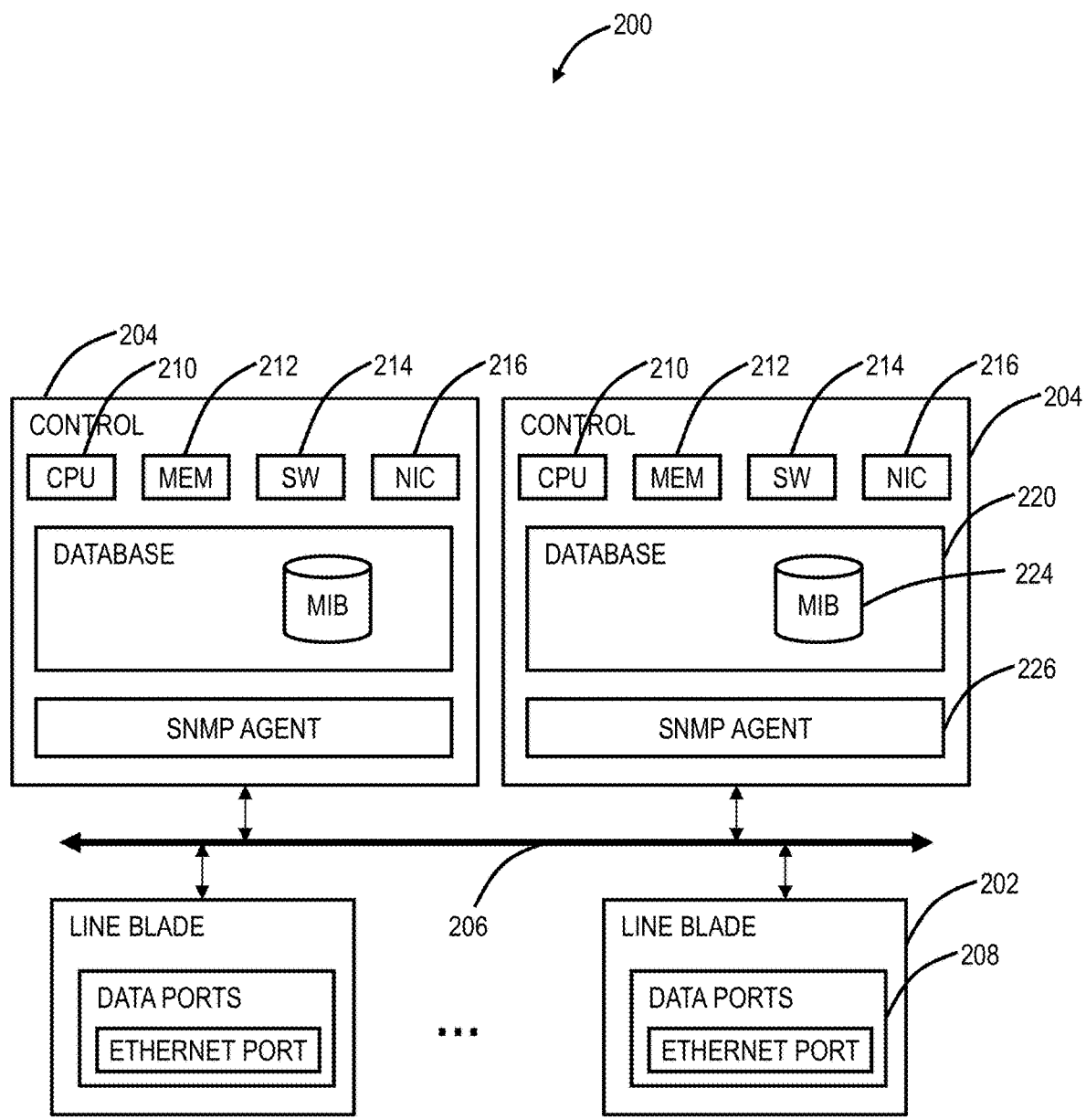
FIG. 7 is a block diagram of an example implementation of a network element.

FIG. 7 is a block diagram of an example implementation of a network element 200. The network element 200 can be an Ethernet network switch for illustration purposes, but those of ordinary skill in the art will recognize the systems and methods described herein contemplate other types of network elements and other implementations. In this embodiment, the network element 200 includes a plurality of blades 202, 204 interconnected via an interface 206. The blades 202, 204 are also known as line cards, line modules, circuit packs, pluggable modules, etc., and generally refer to components mounted within a chassis, shelf, etc. of a data switching device, i.e., the network element 200. Each of the blades 202, 204 may include numerous electronic devices and/or optical devices mounted on a circuit board along with various interconnects including interfaces to the chassis, shelf, etc. Two example blades are illustrated with line blades 202 and control blades 204. The line blades 202 generally include data ports 208 such as a plurality of Ethernet ports. For example, the line blade 202 may include a plurality of physical ports disposed on an exterior of the blade 202 for receiving ingress/egress connections. Additionally, the line blades 202 may include switching components to form a switching fabric via the interface 206 between all of the data ports 208 allowing data traffic to be switched between the data ports 208 on the various line blades 202. The switching fabric is a combination of hardware, software, firmware, etc. that moves data coming into the network element 200 out by the correct port 208 to the next network element. In general, the switching fabric may include switching units, or individual boxes, in a node; integrated circuits contained in the switching units; and programming that allows switching paths to be controlled.

The control blades 204 include a microprocessor 210, memory 212, software 214, and a network interface 216. Specifically, the microprocessor 210, the memory 212, and the software 214 may collectively control, configure, provision, monitor, etc. the network element 200. The network interface 216 may be utilized to communicate with a management system such as a Network Management System (NMS), Element Management System (EMS), and the like. Additionally, the control blades 204 may include a database 220 that tracks and maintains provisioning, configuration, operational data and the like. The database 220 may include a management information base (MIB) 222 which may include CFM objects. Further, the control blades 204 may include a Simple Network Management Protocol (SNMP) Agent 226 configured to operate SNMPv2, SNMPv3, etc. or some other network management communication protocol. In this exemplary embodiment, the network element 200 includes two control blades 204 which may operate in a redundant or protected configuration such as 1:1, 1+1, etc. In general, the control blades 204 maintain dynamic system information including Layer two forwarding databases, protocol state machines, and the operational status of the ports 208 within the network element 200.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A service availability determination method implemented in a packet network element, comprising:
   determining availability of an Ethernet Virtual Circuit (EVC) in a Maintenance Interval (MI) based on frame loss measurements in short intervals $\Delta t$ and marking each $\Delta t$ as available or unavailable based on the frame loss measurements and an associated Frame Loss Ratio (FLR) threshold, wherein each Δt is a High Loss Interval (HLI) when exceeding the FLR threshold;
utilizing a sliding window of size n, n being an integer, to determine whether the EVC is available or unavailable; and
utilizing an extension period of time after an end of the MI with the sliding window to ensure all Δt's in the MI are marked as available or unavailable,
wherein the extension period is between 0 and (n−1) times a length of each Δt.

2. The service availability determination method of claim 1, further comprising:
determining availability of the EVC between two successive MI's which is separated by a repetition time, wherein second MI is inheriting availability state from the previous MI.

3. The service availability determination method of claim 2, further comprising:
determining availability over a time period greater than the MI and the second MI based on the availability determined in at least the MI and the second MI.

4. The service availability determination method of claim 1, wherein, at an end of the MI, if a current availability state is unavailable and the last Δt is not an HLI, the extension period is utilized until there is an HLI interval or n−1 Δt's allowing a last Δt of the MI to be marked as available.

5. The service availability determination method of claim 1, wherein, at an end of the MI, if a current availability state is available and the last Δt is an HLI, the extension period is utilized until there is a non-HLI interval or n−1 Δt's allowing a last Δt of the MI to be marked as unavailable.

6. The service availability determination method of claim 1, wherein the frame loss measurements are compliant to G.8013/Y.1731.

7. A packet network element comprising:
one or more ports;
a switching fabric configured to switch packets between the one or more ports; and
a controller configured to
determine availability of an Ethernet Virtual Circuit (EVC) in a Maintenance Interval (MI) based on frame loss measurements in short intervals Δt and marking each Δt as available or unavailable based on the frame loss measurements and an associated Frame Loss Ratio (FLR) threshold, wherein each Δt is a High Loss Interval (HLI) when exceeding the FLR threshold,
utilize a sliding window of size n, n being an integer, to determine whether the EVC is available or unavailable, and
utilize an extension period of time after an end of the MI with the sliding window to ensure all Δt's in the MI are marked as available or unavailable,
wherein the extension period is between 0 and (n−1) times a length of each Δt.

8. The packet network element of claim 7, wherein the controller is further configured to
determine availability of the EVC between two successive MI's which is separated by a repetition time, wherein second MI is inheriting availability state from the previous MI.

9. The packet network element of claim 8, wherein the controller is further configured to
determine availability over a time period greater than the MI and the second MI based on the availability determined in at least the MI and the second MI.

10. The packet network element of claim 7, wherein, at an end of the MI, if a current availability state is unavailable and the last Δt is not an HLI, the extension period is utilized until there is an HLI interval or n−1 Δt's allowing a last Δt of the MI to be marked as available.

11. The packet network element of claim 7, wherein, at an end of the MI, if a current availability state is available and the last Δt is an HLI, the extension period is utilized until there is a non-HLI interval or n−1 Δt's allowing a last Δt of the MI to be marked as unavailable.

12. The packet network element of claim 7, wherein the frame loss measurements are compliant to G.8013/Y.1731.

13. A packet network element comprising:
one or more ports;
a switching fabric configured to switch packets between the one or more ports; and
a controller configured to
determine availability of an Ethernet Virtual Circuit (EVC) in a Maintenance Interval (MI) based on frame loss measurements in short intervals Δt and marking each Δt as available or unavailable based on the frame loss measurements and an associated Frame Loss Ratio (FLR) threshold, wherein each Δt is a High Loss Interval (HLI) when exceeding the FLR threshold,
utilize a sliding window of size n, n being an integer, to determine whether the EVC is available or unavailable, and
utilize an extension period of time after an end of the MI with the sliding window to ensure all Δt's in the MI are marked as available or unavailable,
wherein, at an end of the MI, if a current availability state is unavailable and the last Δt is not an HLI, the extension period is utilized until there is an HLI interval or n−1 Δt's allowing a last Δt of the MI to be marked as available.

14. The packet network element of claim 13, wherein the controller is further configured to
determine availability of the EVC between two successive MI's which is separated by a repetition time, wherein second MI is inheriting availability state from the previous MI.

15. The packet network element of claim 14, wherein the controller is further configured to
determine availability over a time period greater than the MI and the second MI based on the availability determined in at least the MI and the second MI.

16. The packet network element of claim 13, wherein the extension period is between 0 and (n−1) times a length of each Δt.

17. The packet network element of claim 13, wherein, at an end of the MI, if a current availability state is available and the last Δt is an HLI, the extension period is utilized until there is a non-HLI interval or n−1 Δt's allowing a last Δt of the MI to be marked as unavailable.

18. The packet network element of claim 13, wherein the frame loss measurements are compliant to G.8013/Y.1731.

* * * * *